A. NELSON AND O. H. HINNARD.
NON-SKID WHEEL.
APPLICATION FILED MAY 19, 1919.
1,336,149.
Patented Apr. 6, 1920.
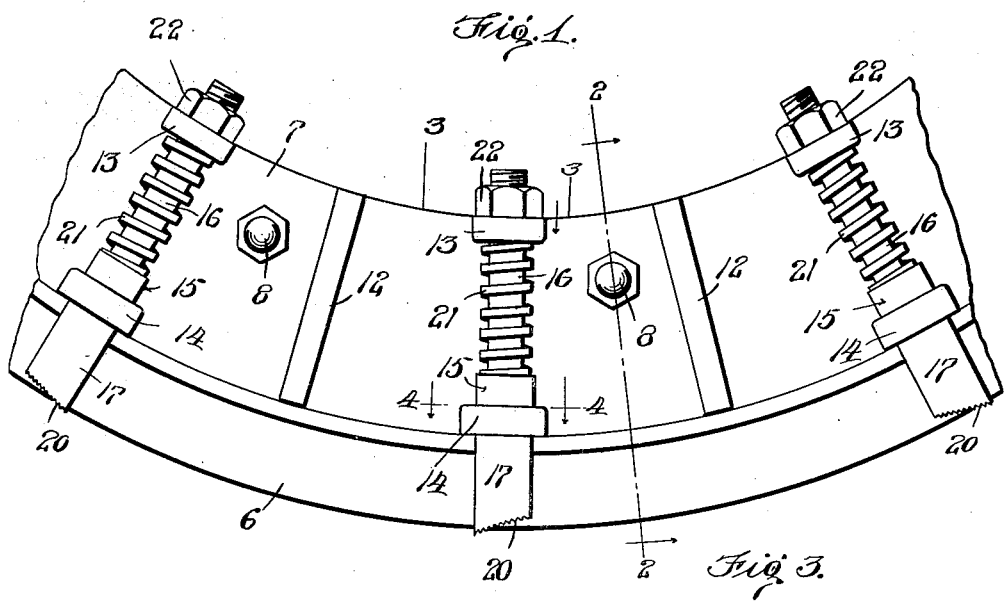
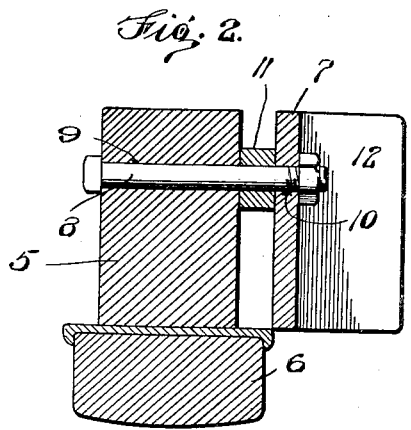
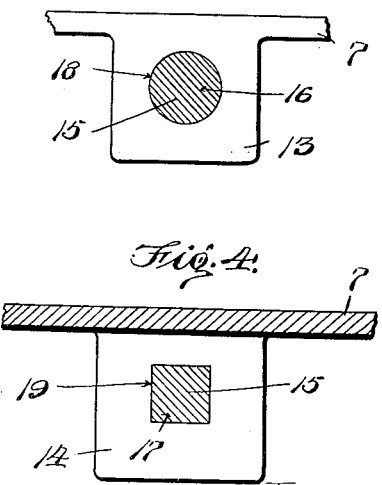

UNITED STATES PATENT OFFICE.

ANDREW NELSON AND OSCAR H. HINNARD, OF CHATTANOOGA, TENNESSEE.

NON-SKID WHEEL.

1,336,149.                 Specification of Letters Patent.        Patented Apr. 6, 1920.

Application filed May 19, 1919. Serial No. 298,308.

*To all whom it may concern:*

Be it known that we, ANDREW NELSON and OSCAR H. HINNARD, citizens of the United States of America, residing at Chattanooga, in the county of Hamilton and State of Tennessee, have invented certain new and useful Improvements in Non-Skid Wheels, of which the following is a specification.

Our invention relates to traction and anti-skidding devices for automobiles.

The object of our invention is to provide an attachment for the ordinary vehicle wheel which will increase traction and prevent skidding.

Other and further objects of our invention will be in part obvious and in part described as the specification is proceeded with.

In the accompanying drawings wherein the preferred embodiment of our invention is shown:

Figure 1 is a side elevation of a portion of a wheel and tire with our invention applied thereto;

Fig. 2 is a section taken on the line 2—2 Fig. 1;

Fig. 3 is a section on the line 3—3 Fig. 1; and

Fig. 4 is a section taken on the line 4—4 Fig. 1.

Referring more specifically to the drawings 5 denotes the rim of a vehicle wheel and 6 the tire thereof, both of usual construction. A metallic band or ring-like member 7 is detachably clamped to one side of the rim 5 by means of bolts 8 which pass through openings 9 and 10 respectively in the rim and band. Spacing washers 11 may be employed for spacing the band from the rim. The member 7 is preferably cast in one piece but may be made in two parts or sections of semi-circular configuration, the ends of adjacent sections being suitably connected together. Vertically disposed blades or webs 12 integrally formed with and projecting at right angles to the ring member 7, serve as traction members when the vehicle wheel sinks into the road bed sufficiently far to bury or partially bury the rim. The member 7 is also provided with radially alined apertured lugs 13 and 14 projecting from the same adjacent the inner and outer edges thereof for the purpose of receiving anti-skidding members 15. These anti-skidding members comprise a round threaded shank portion 16 and a squared head portion 17 and it is understood that the apertures 18 and 19 in the lugs 13 and 14 are round and square respectively. The faces of the head portions 17 are inclined or beveled and are serrated at 20, as clearly shown in the drawings. Coil springs 21 bearing at one end against the lugs 13 and at their other end against the members 15 serve to force the anti-skidding members outwardly in a radial direction and nuts 22 permit of the anti-skidding members being adjusted either inwardly or outwardly as occasion requires.

In practice there may be as many traction and anti-skidding members as may be required, it being understood that these members will be alternately positioned and suitably spaced apart throughout the entire periphery of the ring-like member 7. We do not desire to restrict ourselves to the particular arrangement of the ring-like member as it is obvious that the same may be attached to either side of the rim or that there may be two ring-like members, one on the inside and one on the outside of the rim.

Should an anti-skidding member be subjected to unusual strain as when striking a rock or other obstruction in the road, the former will be forced inwardly against the tension of its coil spring, thus preventing damage or breakage.

Having thus described our invention, what we claim is:

A combined anti-skid and traction attachment for wheels, including a ring-like member adapted for parallel arrangement in proximity to one side of the wheel felly, spaced from said felly and arranged in a plane laterally of the wheel tread, a plurality of spaced radial traction wings formed integral with the outer side of said member and disposed at right-angles to the same and arranged inwardly of said wheel tread, radially disposed apertured lugs integral with the side of the member carrying said wings positioned adjacent the inner and outer edges of said member and between the spaced traction wings, and spring pressed anti-skid members mounted in the apertured lugs having their engaging portions normally disposed adjacent the wheel tread.

ANDREW NELSON.
OSCAR H. HINNARD.

Witnesses:
A. H. SCHMISSRANTER,
ALVIN J. PFITZER.